United States Patent
Goli et al.

(10) Patent No.: US 8,724,629 B1
(45) Date of Patent: May 13, 2014

(54) E-TREE SERVICE HAVING EXTENDED SHARED VLAN LEARNING ACROSS VPLS NETWORK

(75) Inventors: Sri Goli, San Jose, CA (US); Sunesh Rustagi, San Jose, CA (US); Pankaj Shukla, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 137 days.

(21) Appl. No.: 13/159,213

(22) Filed: Jun. 13, 2011

(51) Int. Cl.
*H04L 12/28* (2006.01)

(52) U.S. Cl.
USPC .......................................................... 370/392

(58) Field of Classification Search
USPC ..................................... 370/389, 395.53, 392
See application file for complete search history.

(56) References Cited

U.S. PATENT DOCUMENTS

| | | | |
|---|---|---|---|
| 7,796,593 B1 * | 9/2010 | Ghosh et al. .................... | 370/389 |
| 7,804,790 B1 * | 9/2010 | Aggarwal et al. ............. | 370/256 |
| 2009/0168783 A1 * | 7/2009 | Mohan et al. .............. | 370/395.5 |
| 2009/0175280 A1 * | 7/2009 | Berechya et al. ......... | 370/395.53 |
| 2011/0164617 A1 * | 7/2011 | Yong .............................. | 370/392 |
| 2011/0261812 A1 * | 10/2011 | Kini et al. ...................... | 370/389 |

OTHER PUBLICATIONS

Andersson et al. Network Working Group, Request for Comments: 4664 "Framework for Layer 2 Virtual Private Networks (L2VPNs)", Sep. 2006, total pp. 44.*

Delord et al., Network Working Group, "Control Word Reserved bit for use in E-Tree draft-delord-pwe3-cw-bit-etree-05", Apr. 15, 2011, total pp. 9.*

Jiang et al. Network Working Group, "VPLS PE Model for E-Tree Support draft-jiang-l2vpn-vpls-pe-etree-02.txt", Oct. 25, 2010, total pp. 19.*

Zimmerman, "OSI Reference Model-The ISO Model of Architecture for Open Systems Interconnection", IEEE Transactions on Communications, vol. Com-28, No. 4, Apr. 1980, p. 425-432.

Key et al. "Requirements for MEF E-Tree Support in VPLS draft-key-l2vpn-vpls-etree-reqt-02.txt", Network Working Group, Oct. 2010.

"IEEE 802.1: 802.1ad-Provider Bridges", Available at http://www.ieee802.org/1/pages/802.1ad.html, IEEE, May 26, 2006 (accessed Jun. 13, 2011), p. 1-3.

Kompella et al. "Virtual Private LAN Service (VPLS) Using BGP for Auto-Discovery and Signaling", RFC 4761, Network Working Group, The IETF Trust, Jan. 2007, p. 1-27.

* cited by examiner

*Primary Examiner* — Andrew Chriss
*Assistant Examiner* — Peter Mak
(74) *Attorney, Agent, or Firm* — Shumaker & Sieffert, P.A.

(57) ABSTRACT

Techniques are described for supporting metro Ethernet "E-TREE" service over a packet-switched MPLS network, including a VPLS core, in a manner that allows a service provide to easily integrate with different types of technologies deployed by its various customers. Moreover, the techniques described herein provide increased flexibility with respect to the topology of the roots and leafs of the E-TREE service and, in particular, allow roots and leaf nodes to be coupled to a common router that provides access to the VPLS core. An NNI port of a PE router may process network traffic to provide E-TREE service to a bridged network having both leaf nodes and root nodes process and direct traffic between logical interfaces as changed next hops.

15 Claims, 8 Drawing Sheets

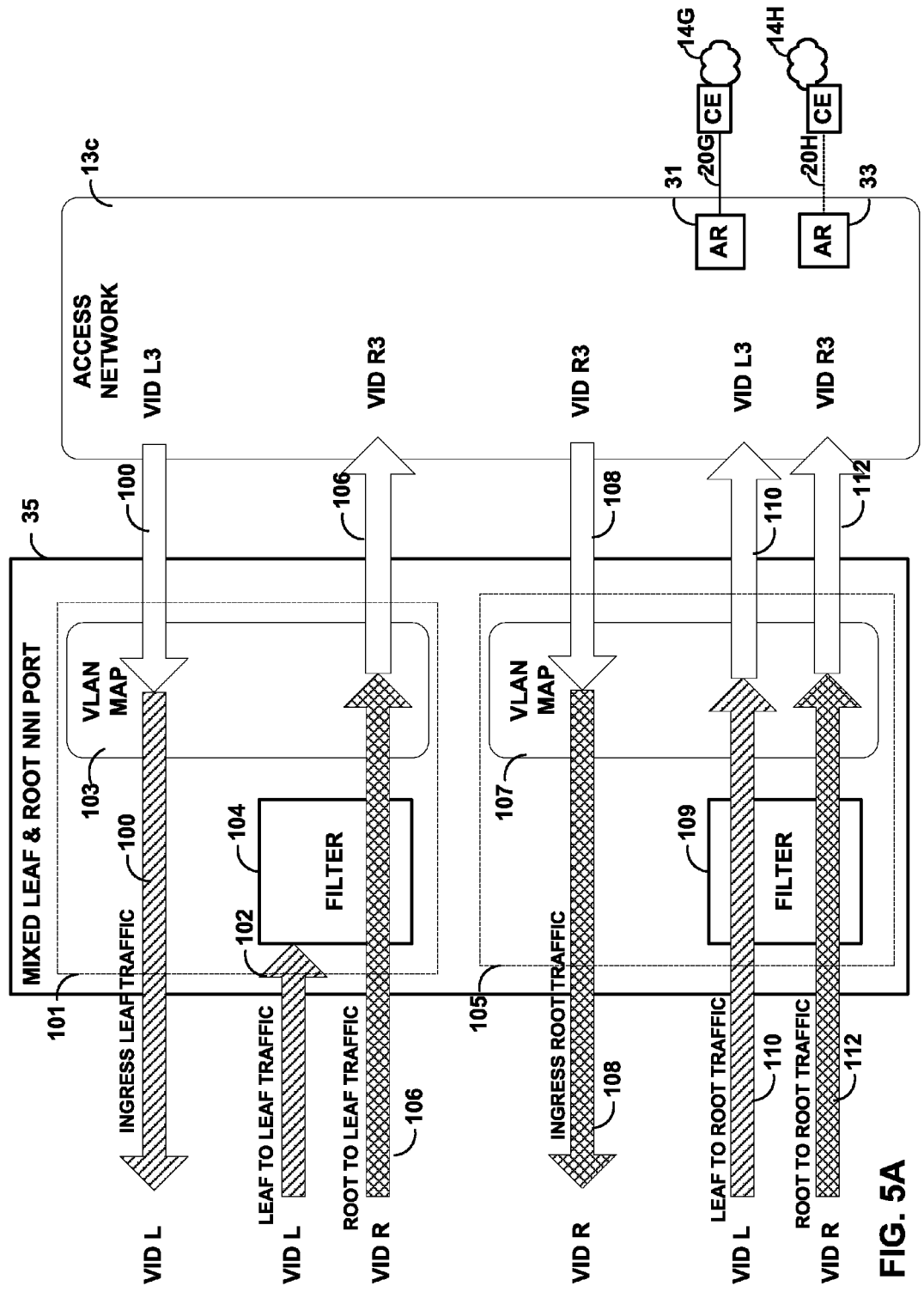

E-TREE SERVICE HAVING EXTENDED SHARED VLAN LEARNING ACROSS VPLS NETWORK

TECHNICAL FIELD

The invention relates to electronic computer networks and, more specifically, to layer two (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers) are connected by one or more Ethernet switches. The Ethernet switches forward Ethernet frames, also referred to as L2 communications or L2 packets, to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically broadcasts the Ethernet frame to all of the other physical ports of the switch unless the Ethernet switch has learned the specific physical port through which to the destination MAC address devices is reachable. In this case, the Ethernet switch forwards a single copy of the Ethernet frame out the associated physical port.

One type of large area L2 network connectivity being developed is referred to as "Metro Ethernet" in which Ethernet is used as a metropolitan access network to connect subscribers and businesses to a larger service network or the Internet. Various types of Ethernet services have been defined to provide different forms of connectivity. One type of metro Ethernet service, referred to as "E-TREE" service, has recently been defined in which Ethernet communication is constrained to point-to-multipoint (P2MP). With E-TREE service, each endpoint L2 device is designated as either a root or a leaf. L2 devices designated as roots are permitted to communicate with all other endpoints on the E-Tree. However, L2 devices designated as leafs on the E-tree are permitted to communicate only with L2 devices that are designated as root devices.

The Internet Engineering Task Force (IETF) has proposed Metro Ethernet E-Tree support in multi-protocol label switching (MPLS) networks, including those utilizing the Virtual Private LAN Service (VPLS), also known as Transparent LAN Service and Virtual Private Switched Network service. The VPLS service offers a Layer 2 Virtual Private Network (VPN) in which the customers in the VPN are connected by a multipoint Ethernet LAN. One example proposal for providing E-TREE service over VPLS can be found in "Requirements for MEF E-Tree Support in VPLS," draft-key-l2vpn-vpls-etree-reqt-02.txt, Oct. 7, 2010, hereby incorporated by reference in its entirety. Further details of VPLS can be found in, Kompella & Rekhter, Virtual Private LAN Service (VPLS), "Using BGP for Auto-Discovery and Signaling," IETF, January 2007, hereby incorporated by reference in its entirety.

However, certain difficulties may arise when deploying conventional E-TREE service, especially in VPLS environments. For example, problems may arise when root and leaf nodes are connected to the same router or other network device that provides access to the VPLS core. In such cases, other routers providing the E-TREE service over the VPLS core often cannot distinguish any root traffic and leaf traffic sourced by the router, which makes it difficult to comply with the forwarding constraints of the E-TREE service. As a result, some vendors have simply required that their customers avoid such deployments.

Furthermore, service provides may utilize different types of access networks for providing connectivity to customer networks for which the E-TREE service may be deployed. In some cases, connectivity to the VPLS core may be provided to the customer networks by the service provider using point-to-point spoke VLANs through an intermediate access network. In other cases, L2 network connectivity may take the form of provider bridging in accordance with IEEE standards 802.1ad and 802.1q. Provider bridging defines an architecture in which a service provider provides one or more service VLANs ("S-VLANS") to service and isolate L2 traffic from customer networks. This allows customers to effective run their own VLANs inside the VLAN provided by the service provider. Further details of provider bridging can be found in Institute of Electrical and Electronics Engineers, Inc., IEEE P802.1ad, "Provider Bridges," May 26, 2006, hereby incorporated by reference in its entirety.

SUMMARY

In general, techniques are described for supporting metro Ethernet "E-TREE" service over a packet-switched MPLS network, including a VPLS core. Moreover, the techniques normalize traffic communicated between customer edge domains that utilize different types of L2 access network to connect to the VPLS core. For example, the techniques may simplify traffic forwarding within the VPLS core by use of two normalized VLANs: one to carry traffic originating from root nodes and one to carry traffic originating from leaf nodes, regardless of the type of L2 connectivity provided to the customer edge domains. As such, the techniques may allow a service provide to easily integrate with different types of technologies deployed by its various customers. Moreover, the techniques described herein provide increased flexibility with respect to the topology of the roots and leafs of the E-TREE service and, in particular, allow roots and leaf nodes to be coupled to a common router that provides access to the VPLS core. Consequently, the service provider may be able to provide metro E-TREE service in environments with which the service could not previously be provided.

In one embodiment, a method comprises receiving L2 communications for a plurality of customer networks at a plurality of provider edge (PE) routers that provide VPLS service through a provider network for a plurality of customer networks, wherein the customer networks are coupled to the PE routers by at least two different types of L2 access networks. The method includes applying a normalized leaf VLAN tag to the L2 communications that originated from the customer networks designated as leaf nodes and applying a normalized root VLAN tag to the customer communication that originated from customer networks designated as root nodes regardless of the type of L2 access network that couples the customer network to the PE routers. The method further comprises transporting the L2 communications tagged with the normalized leaf VLAN tag through the service provider network on a single leaf VLAN and transporting the L2 communications tagged with the normalized root VLAN tag through the service provider network on a single root VLAN.

In another embodiment, a network device comprises a forwarding component having a leaf logical interface and a root logical interface to receive L2 communications a bridged L2 access network. The leaf logical interface receives L2 communications from a customer network designated as a leaf node and the leaf logical interface receives L2 communications from a customer network designated as a leaf node. The network device includes a data structure updated by the forwarding component to store L2 network addresses of the L2 communications received on the root logical interface and the leaf logical interface. A VPLS protocol executes on the network device to establish a VPLS service with one or more other network devices to transport the L2 communications through a service provider network as VPLS packets. The network device further includes a filter associated with the leaf logical interface that is configured to apply a normalized leaf virtual local area network (VLAN) tag to the L2 communications received on the leaf logical interface to form tagged VLAN packets for transport through the VPLS on a leaf VLAN that carries L2 communications from leaf nodes that are coupled to the service provider network by plurality of different types of access networks. The network device further includes a filter associated with the leaf logical interface configured to apply a normalized root virtual local area network (VLAN) tag to the L2 communications received on the root logical interface to form tagged VLAN packets for transport through the VPLS service on a root VLAN that carries L2 communications from root nodes that are coupled to the service provider network by plurality of different types of access networks.

In another embodiment, a network device comprises a forwarding component having a leaf logical interface and a root logical interface to receive layer two (L2) communications a bridged L2 access network, wherein the leaf logical interface receives L2 communications from a customer network designated as a root node and the leaf logical interface receives L2 communications from a customer network designated as a leaf node of a Ethernet service in which each of a plurality of customer networks is designated as either a leaf node that is permitted to communicate only with root nodes or as a root node that is permitted to communicate with all other nodes of the Ethernet service. The network device includes a data structure updated by the forwarding component to store L2 network addresses of the L2 communications received on the root logical interface and the leaf logical interface. The network device further includes a Virtual Private LAN Service (VPLS) protocol to establish a VPLS service with one or more other network devices to transport the L2 communications through a service provider network as VPLS packets. The network device further includes a filter associated with the leaf logical interface configured to apply a normalized leaf virtual local area network (VLAN) tag to the L2 communications received on the leaf logical interface to form tagged VLAN packets for transport through the VPLS on a leaf VLAN. The network device further includes a filter associated with the root logical interface configured to apply a normalized root virtual local area network (VLAN) tag to the L2 communications received on the root logical interface to form tagged VLAN packets for transport through the VPLS service on a root VLAN, wherein the filter associated with the leaf logical interface is configured to redirect egress VPLS packets having the normalized leaf VLAN tag from the leaf logical interface to the root logical interface for forwarding to the access network as outbound L2 communications, and wherein the filter associated with the root logical interface configured to redirect egress VPLS packets having the normalized leaf VLAN tag from the root logical interface to the leaf logical interface for forwarding to the access network as outbound L2 communications.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5A and 5B are block diagrams illustrating two different embodiments for processing network traffic at an NNI port of a PE router at the edge of a VPLS core when the router provides E-TREE service to a bridged access network having both leaf nodes and root nodes.

DETAILED DESCRIPTION

Figure 1:
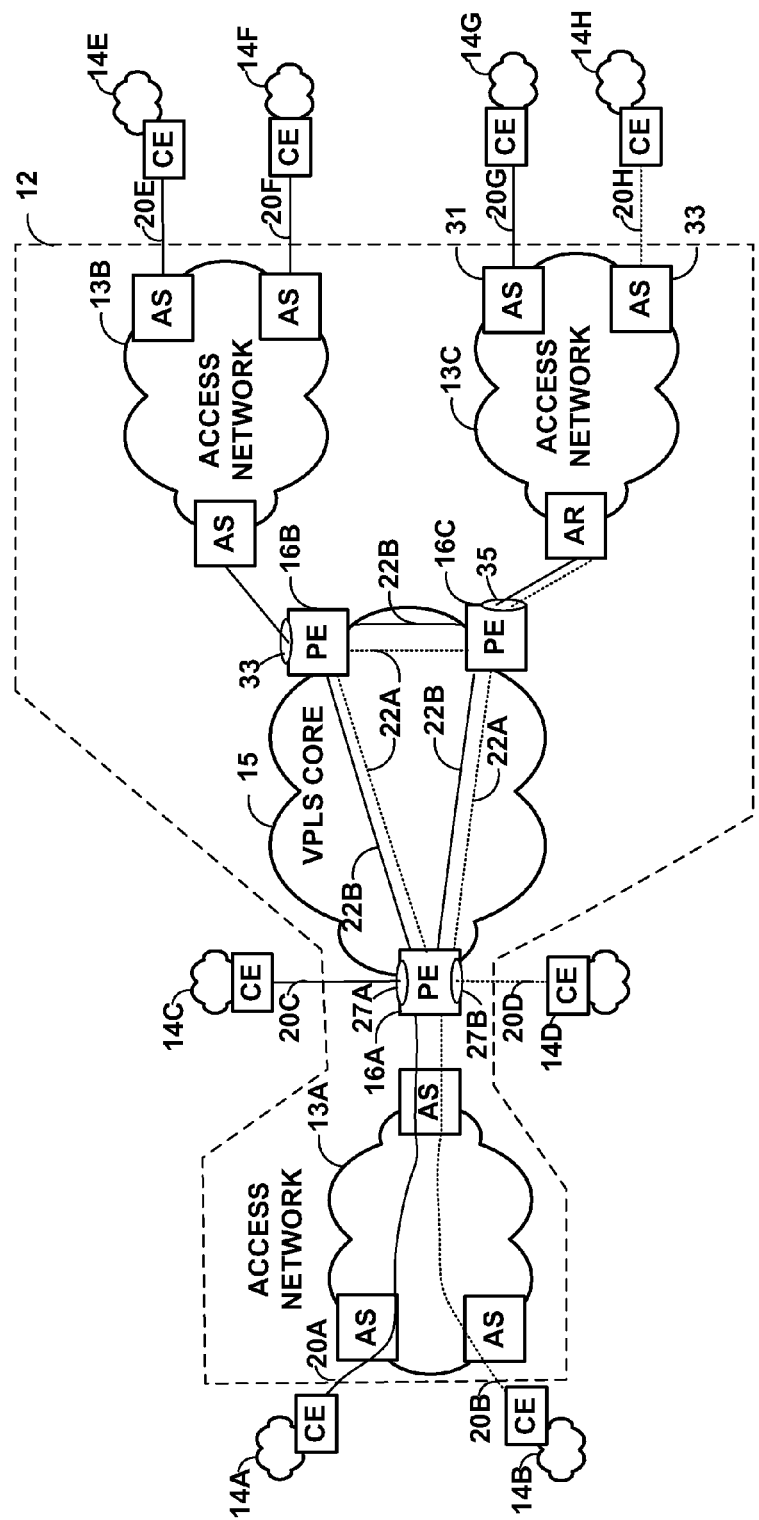
FIG. 1 is a block diagram illustrating a network system that supports metro Ethernet "E-TREE" service over a VPLS core network according to the techniques described herein.

FIG. 1 is a block diagram illustrating a network system 10 that supports metro Ethernet "E-TREE" service over a VPLS core network 12 according to the techniques described herein. As shown in FIG. 1, network system 10 includes a service provider network 12 includes a VPLS core network 12 and a plurality of access networks 13A-13C ("access networks 13"). Each of access networks 13 provides network connectivity to one or more customer networks 14A-14H ("customer networks 14"). Network 12 may represent a network that is owned and operated by a service provider to interconnect a plurality of edge networks, such as customer networks 14. As a result, network 12 may be referred to herein as a Service Provider (SP) network, and VPLS core 15 may be referred to as a "core network" in that VPLS core 15 may act as a core to interconnect other SP networks or edge networks, such as customer networks 14. Example service providers include Verizon Communications Inc. or American Telephone & Telegraph (AT&T™) Company.

The service providers may lease portions of network 12 or provide bridging (or switching) services offering interconnection through network 12 to customer networks 14, which may lease the portions or purchase the services provided by network 12 to create a Layer 2 Virtual Private Network (L2VPN) interconnecting the various layer 2 (L2) customer networks 14. The bridging service may be, for example, an L2VPN, a Virtual Private Local Area Network (LAN) Service (VPLS), or a virtual leased line (VLL). Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

In the illustrated embodiment, network 12 provides a type of L2VPN, a VPLS instance in this example, to transparently interconnect the layer 2 networks, e.g., customer networks 14, to one another via service provider network 12. Service provider network 12 may provide VPLS core 15 to a customer by transparently emulating a direct connection between these various customer networks 14 such that, from the perspective of customer networks 14, each of customer networks 14 appears to directly connect to one another. Moreover, different VPLS instances, including corresponding virtual routing and forwarding information (VRFs), may be maintained by routers within service provider network 12.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to purchase a service offered by service provider network 12, such as VPLS core 15, in order to transparently interconnect these networks 14 in the manner described above.

Each of customer networks 14 may operate according to a wide variety of network protocols, such as any of the 802.3x family of network protocols related to the Ethernet protocol, any of the 802.1x family of wireless networking protocols, an Internet Protocol (IP) protocol, and a Transmission Control Protocol (TCP). Moreover, one or more of customer networks 14 may comprise a Virtual Private Network (VPN), a Large Area Network (LAN), or a Wide Area Network (WAN). Although not shown in FIG. 1 for ease of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Service Provider network 12 includes a plurality of provider edge (PE) routers 16A-16C ("PEs 16") and access switches ("AS"). While discussed herein with respect to a particular type of network device, i.e., a layer two switch, access switches and PEs 16 of service provider network 12 may each represent any network device that interfaces with a network, such as one of customer networks 14, to route, switch, bridge or otherwise forward network traffic directed to or originating from the network. For example, PEs 16 may each represent, in certain instances, one or more of a switch, a hub, a bridge device (e.g., an Ethernet bridge), or any other L2 network device and, in some instances, L3 network devices capable of performing L2 functionality.

PEs 16 couple to respective customer networks 14 via attachment circuits ("ACs 20"). Each of ACs 20 is a physical or virtual circuit attaching a respective customer network 14 to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 20 may each comprise a direct link or an access network.

PEs 16 and access switches of service provider network 12 provide one or more services, such as the illustrated VPLS core 15, to transparently interconnect customer networks 14 to one another. For example, service provider network 12 provides E-TREE service that provides and enforces a constrained P2MP connectivity between customer networks 14. In this form of L2 connectivity, interfaces of PEs 14 to access links of customer networks 14, and customer edge ("CE") devices associated therewith, are designated as either a root or a leaf with respect to the L2 traffic. Service provider network 12 permits CE devices designated as roots to communicate with all other endpoints on the E-Tree. However, service provider network 12 allows CE devices designated as leafs on the E-tree to communicate only with CE devices that are designated as root devices. In the example of FIG. 1, CEs of customer networks 14A, 14C and 14E-140G are designated as leafs of the E-TREE service and access links 20A, 20C and 20E-20G are shown as solid lines. In contrast, CEs of customer networks 14B, 14D and 14H are designated as roots of the E-TREE service and corresponding access links 20B, 20D and 20H are shown as dashed lines.

PEs 16 and the access switches of service provider network 12 provide different types of L2 connectivity to customer networks 14. In one example shown in FIG. 1, customer networks 14C (a leaf) and 14D (a root) are coupled directly to PE 16A at the edge of VPLS core 15. In this case, customer networks 14C, 14D may directly configure PE 16A. This type of connectivity may be provided to each access link 20C, 20D by a corresponding User Network Interface (UNI) 27 of PE 16A, which is a demarcation point between the service provider and the subscriber, i.e., customer networks 14C and 14D. Processing of network traffic by PE 16A at these UNI ports 27 is described in more detail below with respect to FIGS. 2A and 2B.

In a second example of L2 connectivity shown in FIG. 1, customer networks 14A (a leaf) and 14B (a root) are also coupled to the same PE router, PE 16 in this case, via access network 13A. However, customer networks 14A, 14B are configured as VLAN spoke sites where access links 20A, 20B are point-to-point VLANS terminated by the CE devices of the customer networks and PE router 16A. Processing of network traffic by PE 16A with respect to VLAN spokes is described in more detail below with respect to FIGS. 3A and 3B.

In a third example of L2 connectivity shown in FIG. 1, customer networks 14E and 14F are coupled to PE router 16 via bridged access network 13B having only leaf nodes. Unlike access network 13A in which customer traffic flows through VLAN spokes, access network 13B provides bridged Ethernet connectivity between VPLS core 15 and customer networks 14E, 14F. This type of connectivity may be provided by a corresponding Network to Network Interface (NNI) 33 of PE 16B. Moreover, both customer networks 14E, 14F are dedicated as leaf nodes. Processing of network traffic received from and sent to an NNI port of PE 16B with respect for servicing only leafs of the E-TREE services is described in more detail below with respect to FIG. 4.

In a fourth example of L2 connectivity shown in FIG. 1, customer networks 14G and 14H are coupled to PE router 16 via a bridged access network 13C having both leaf and root nodes. Like access network 13B, access network 13C provides bridged Ethernet connectivity to the VPLS core 15 via an NNI port 35 that provides connectivity to the access network. However, unlike PE router 16B, PE router 16C must properly enforce the E-TREE service with respect to mixed traffic for both leafs (i.e., customer networks 14G in this example) and roots (customer network 14H). Processing of network traffic received from and sent to NNI port 35 of PE 16C with respect for servicing both leafs and roots of the E-TREE services is described in more detail below with respect to FIGS. 5A and 5B.

As described herein, the techniques allow service provide network 10 to easily integrate with different types of technologies deployed by various customer networks 14. Moreover, the techniques provide increased flexibility with respect to the topology of the roots and leaves of the E-TREE service and, in particular, allow a mixture of root and leaf nodes to be coupled to a common PE router (e.g., PE routers 16A, 16C) that provides access to VPLS core 15. Consequently, the service provider may be able to provide metro E-TREE service in environments with which the service could not previously be provided. The techniques may simplify traffic forwarding within the VPLS core by use of two normalized VLANS to carry all traffic for the VPLS instance. For example, as shown in FIG. 1, PEs 16 may apply a first VLAN identifier ("VID") to all traffic originating from root nodes and transport the traffic on a first VLAN 22A (shown as dashed lines) over point-to-point pseudowires, regardless of the type of L2 connectivity provided by the particular access network (if any) to which the root customer network is coupled. PEs 16 may apply a second VLAN identifier to all traffic originating from leaf nodes, regardless of the type of L2 connectivity provided to access network (if any) to which the leaf customer network is coupled, and transport the traffic on a second VLAN 22B point to point pseudowires. Moreover, these two normalized VLANs may carry all leaf and root traffic with the VPLS core for all VPLS instances since the traffic for different instances may be transported by different pseudowires. The techniques do not apply any restrictions to any VLANS used by access networks 13 and customer networks 14.

Figure 2A:
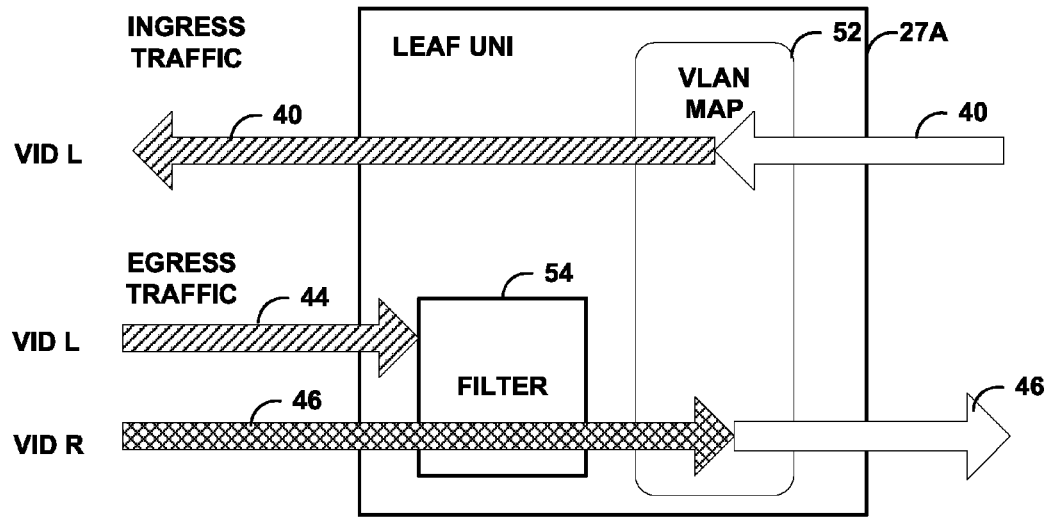
FIGS. 2A and 2B are block diagrams illustrating example processing of network traffic by a PE router at the edge of a VPLS core for interfaces that directly connect to customer edge devices of leafs and roots of an E-TREE service.
Figure 2B:
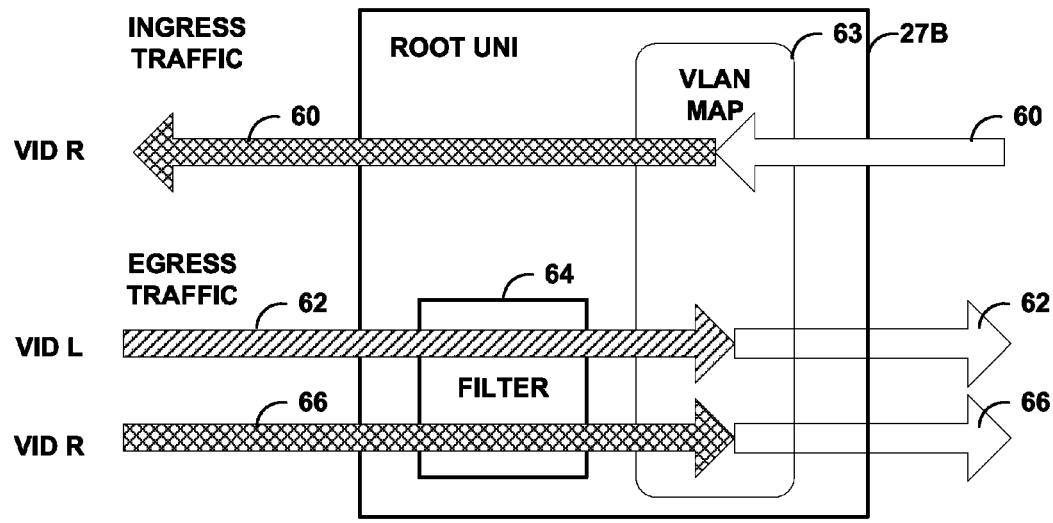

FIGS. 2A and 2B are block diagrams illustrating example processing of network traffic by a PE router at the edge of a VPLS core for interfaces that directly connect to customer edge devices of leafs and roots of an E-TREE service. For example, FIG. 2A illustrates example processing at UNI port 27A of PE 16A with respect to network traffic communicated between VPLS core 15 and customer network 14C.

As shown in the example of FIG. 2A, PE router 16A receives inbound L2 traffic 40 from leaf customer network 14C on customer-facing UNI port 27A configured as a leaf interface. L2 traffic 40 typically comprises Ethernet frames but, in the general case, may be any other form of L2 subscriber frame, such as ATM cells. Moreover, as UNI port 27A is directly coupled to customer network 14C, L2 traffic 40 may be untagged L2 traffic. In other words, L2 traffic 40 may not necessarily be encapsulated with a VLAN tag or other header.

When processing the L2 traffic 40 from leaf customer network 14C, PE 16A applies a VLAN map 50 to select and apply a normalized leaf VLAN identifier ("VID") (shown for illustration as "L") to the L2 traffic to encapsulate the L2 subscriber frames and form VLAN packet. In particular, PE 16A applies VLAN map 50 to map the customer traffic to a normalized VID for leaf nodes of the E-TREE instance for which customer network 14C is a member. The normalized leaf VLAN tag is used within VPLS core 15 to identify the L2 traffic as ingressing from a port or access link configured as a leaf node in an E-TREE service and, in some embodiments, may be commonly used across multiple E-TREE services of VPLS core 15. PE 16A pushes normalized leaf VID onto the L2 traffic and any pseudowire label necessary to forward the encapsulated L2 subscriber frames to PEs 16B, 16C through VPLS core 15 in accordance with VPLS forwarding requirements.

When processing the traffic egressing VPLS core 15 at UNI port 27A, PE router 16A applies an egress filter 54 within a forwarding path of the PE router to filter the outbound VPLS L2 traffic based on whether the VPLS traffic carries the normalized leaf VID or the normalized root VID used within the VPLS core. In particular, filter 54 discards VPLS traffic 44 marked with the normalized leaf VID and, therefore, does not allow VPLS traffic 44 to reach leaf customer network 14C, thereby preventing leaf-to-leaf L2 communication in accordance with the E-TREE service. In contrast, filter 43 allows VPLS traffic 46 marked with normalized root VID ("R" in this example) to proceed without being dropped. PE router 16A applies VLAN map 52 to pop the outer normalized VID and forwards untagged L2 traffic 46 that originated from a root of the E-TREE service to leaf customer network 14C, thereby allowing root-to-leaf communications on UNI port 27A.

FIG. 2B shows example processing on customer-facing UNI port 27B that couples PE router 16A to a root customer network 14D. In this case, PE router 16A receives inbound L2 traffic 60, e.g., untagged Ethernet frames, from root customer network 14D on UNI port 27B that is configured as a root interface. When processing the L2 traffic 40 from root customer network 14D, PE 16A applies VLAN map 63 to select and apply a normalized root VID ("R") to the L2 traffic to encapsulate the L2 subscriber frames and form VLAN tagged packet. In particular, PE 16A applies VLAN map 63 to map the customer traffic to a normalized VID for root nodes of the E-TREE instance for which customer network 14D is a member. PE 16A then pushes the normalized VID onto the L2 traffic, as well as any additional pseudowire labels, and forwards the encapsulated L2 subscriber frames to PEs 16B, 16C through VPLS core 15 in accordance with VPLS forwarding requirements.

When processing the traffic egressing VPLS core 15 at UNI port 27B, PE router 16A performs a packet lookup to select an outbound interface and applies to the VPLS traffic an egress filter 64 associated with that selected outbound interface. In this case, the selected egress filter 64 of PE router 16A is configured to allow both leaf VPLS traffic 62 and root VPLS traffic 66 to proceed without being discarded. PE router 16A applies VLAN map 63 to pop the outer VID of the VPLS packets and forwards the L2 traffic 62, 64 to root customer network 14D, thereby allowing leaf-to-root and root-to-root communications for the E-TREE service on UNI port 27B.

Figure 3A:
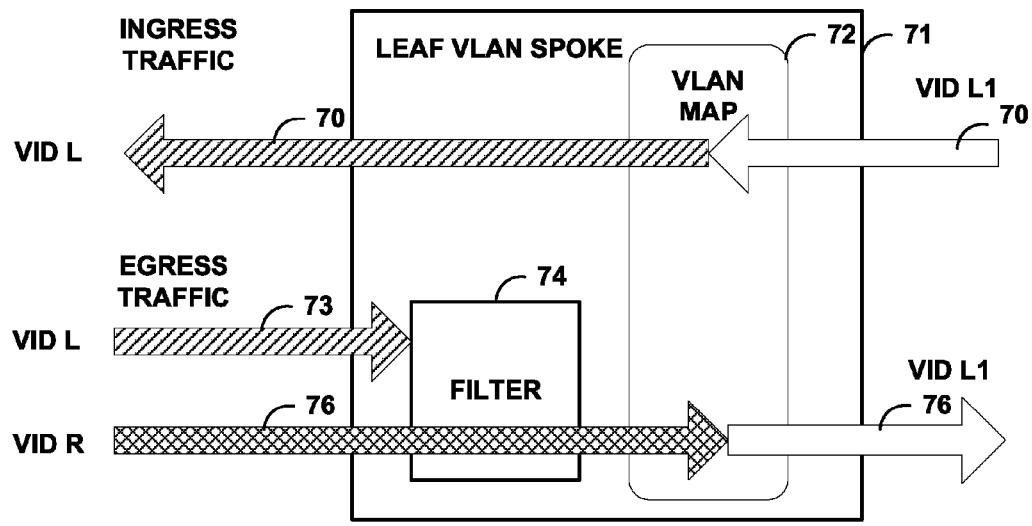
FIGS. 3A and 3B are block diagrams illustrating example processing of network traffic by a PE router at the edge of a VPLS core with respect to leafs and roots of an E-TREE service that are coupled to the PE router by point-to-point VLAN spokes.
Figure 3B:
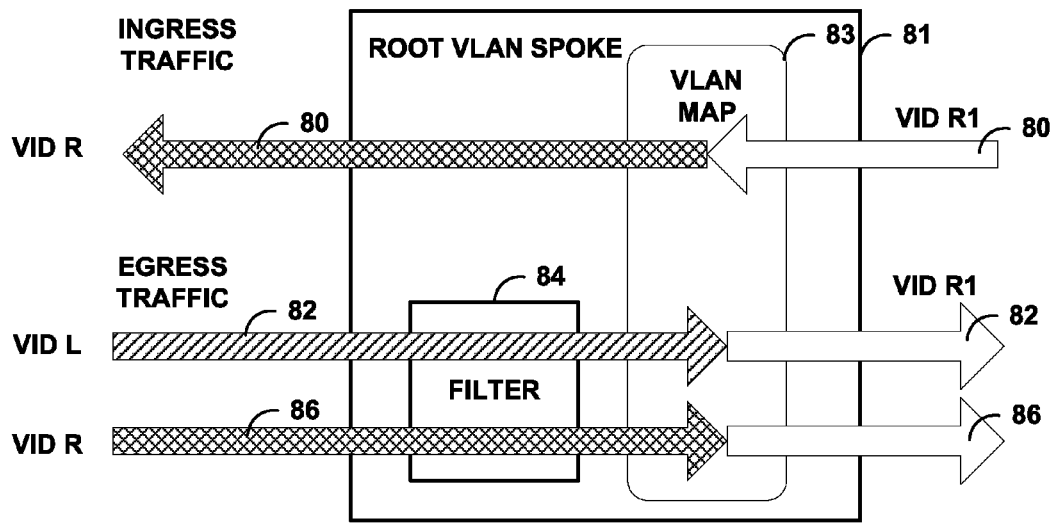

FIGS. 3A and 3B are block diagrams illustrating example processing of network traffic by a PE router at the edge of a VPLS core with respect to leafs and roots of an E-TREE service that are coupled to the PE router by point-to-point VLAN spokes. For example, FIG. 3A illustrates example processing by PE 16A with respect to network traffic communicated between VPLS core 15 and leaf customer network 14A via VLAN spoke 20A. For example, FIG. 3B illustrates example processing by PE 16A with respect to network traffic communicated between VPLS core 15 and root customer network 14B via VLAN spoke 20B.

As shown in the example of FIG. 3A, PE router 16A receives inbound VLAN traffic 70 from leaf customer network 14A on leaf VLAN 22A. VLAN traffic 70 typically comprises Ethernet frames or other L2 communication having an outer VLAN identifier ("L1" in this example) that was added by access switches ("AR") at the edge of access network 13A to identify the service. When processing the VLAN traffic 70 from leaf customer network 14A, the leaf interface of PE 16A is configured to apply a VLAN map 72 to swap the outer VID ("L1") for the normalized leaf VID ("L") to form VLAN tagged L2 packets for normalized leaf VLAN 22B of VPLS core 15. In this way, the VLAN identifier "L1" is used within access network 13A to identify the service, and PE router 16A is configured to detect this local VLAN identifier and swap the tag with the normalized VLAN tag "L" used within VPLS core 15. PE 16A may also push any additional pseudowire labels and forwards the VPLS traffic to PEs 16B, 16C through VPLS core 15 in accordance with VPLS forwarding requirements.

When processing the traffic egressing VPLS core 15 to leaf VLAN spoke 20A, PE router 16A selects the egress interface associated with VLAN spoke 20A and applies an egress filter 74 associated with the interface to filter VPLS traffic based on whether the VPLS traffic carries the normalized leaf VID or the normalized root VID used within VPLS core 15. In particular, filter 74 discards VPLS traffic 73 marked with the normalized leaf VID and, therefore, does not allow VPLS traffic 73 to reach leaf customer network 14A, thereby preventing leaf-to-leaf L2 communication in accordance with the E-TREE service. In contrast, filter 74 allows VPLS traffic 76 marked with normalized root VID ("R" in this example) to proceed without being dropped. PE router 16A applies VLAN map 74 to swap the outer normalized VID with the VID of customer network 14A ("L1" in this example) and forwards VPLS traffic 76 that originated from a root of the E-TREE service to leaf customer network 14A, thereby allowing root-to-leaf communications on VLAN 22A.

FIG. 3B illustrates example processing of VLAN traffic with a PE router when coupled to root node via a spoke VLAN. In this example, PE router 16A receives inbound VLAN traffic 80 from root customer network 14B on root VLAN 22B. When processing the root VLAN traffic 80 from root customer network 14B, PE 16A applies VLAN map 83 to swap the outer VID ("R1") of the spoke VLAN for the normalized root VID ("R") to form VLAN tagged packets for normalized root VLAN 22A of VPLS core 15. PE 16A may also push any additional pseudowire labels and forwards the VPLS traffic to PEs 16B, 16C through VPLS core 15 in accordance with VPLS forwarding requirements.

When processing the traffic egressing VPLS core 15 at an interface coupled to root VLAN spoke 20B, PE router 16A applies egress filter 84 to the VPLS traffic. In this case, filter 84 is configured to allow both leaf VPLS traffic 82 and root VPLS traffic 86 to proceed without being discarded. Moreover, PE router 16A applies VLAN map 83 to swap the outer normalized VID of the VPLS traffic 82, 86 with the VID of the spoke VLAN ("R1"). In this case, regardless of whether the VPLS traffic carried the normalized leaf VID (as in VPLS traffic 82) or the normalized root VID (as in VPLS traffic 86), VLAN map 83 is configured to replace the normalized VID with the root VID "R1" of the spoke VLAN 20B so that the traffic is properly delivered to customer network 14B. PE router 16B forwards the VPLS traffic to root customer network 14B on spoke VLAN 20B, thereby allowing both leaf-to-root and root-to-root communications for the E-TREE service on root VLAN 22B.

Figure 4:
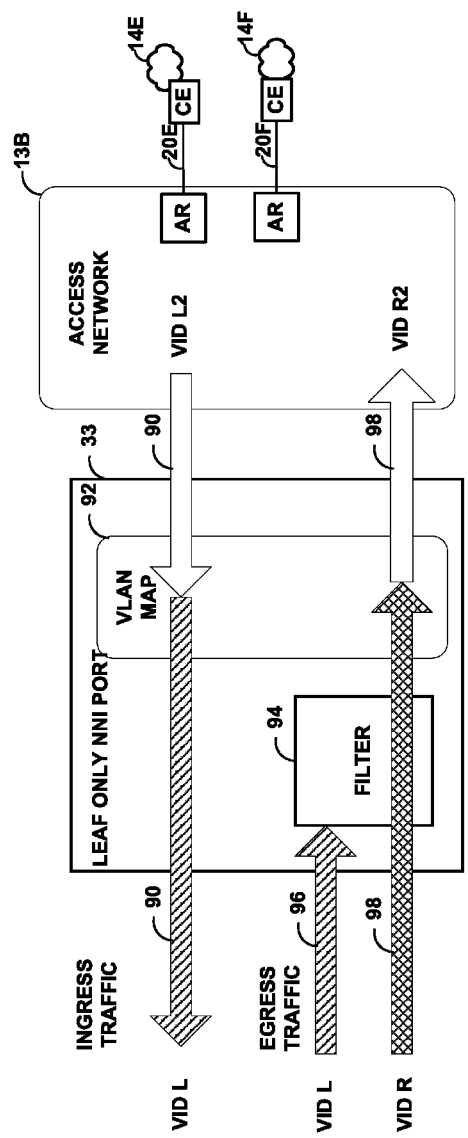
FIG. 4 is a block diagram illustrating example processing of network traffic at an NNI port of a PE router at the edge of a VPLS core when the router provides E-TREE service to a bridged network having only leaf nodes.

FIG. 4 is a block diagram illustrating example processing of network traffic at an NNI port of a PE router at the edge of a VPLS core when the router provides E-TREE service to a bridged network having only leaf nodes. For example, FIG. 4 illustrates example processing at NNI port 33 by PE 16B with respect to network traffic communicated between VPLS core 15 and access network 13B that provides bridged Ethernet connectivity to customer networks 14E, 14F. In this case, because bridging is involved in the edge domain (access network 13B), PE 16B typically may be unable to determine whether the bridged access network provides connectivity to both leafs and roots. In such cases, discussed in further detail below with respect to FIGS. 5A and 5B. However, in the example of FIG. 4, PE router 13B is configured to ahead of time by an administrator with data indicating that only leaf nodes exists on bridged access network 13B. In the case where such configuration data is not present, PE router 13B could operate in accordance with the example processing shown in FIGS. 5A and 5B with respect to bridged access networks.

As shown in the example of FIG. 4, PE router 16A receives inbound bridged Ethernet traffic 90 from customer networks 14E, 14F via access network 13B. In this case, PE router 16A processes all inbound bridged Ethernet traffic 90 as leaf traffic due to the configuration settings. As bridged Ethernet traffic, VLAN traffic 90 typically comprises Ethernet frames or other L2 communication having an outer VLAN identifier, e.g. "L2," which indicates that the bridged Ethernet traffic originated at a leaf. When processing the leaf VLAN traffic 90 from bridged access network 13B, PE 16B applies VLAN map 92 to swap the outer VID ("L2") for the normalized leaf VID ("L") to form VLAN tagged L2 packets for normalized leaf VLAN 22B of VPLS core 15. PE 16B may also push any additional pseudowire labels and forwards the VPLS traffic to PEs 16A, 16C through VPLS core 15 in accordance with VPLS forwarding requirements.

When processing the traffic egressing VPLS core 15 to bridged access network 13B, PE router 16C applies filter 94 that filters VPLS traffic 96 based on whether the VPLS traffic carries the normalized leaf VID or the normalized root VID used within VPLS core 15. In particular, filter 94 discards VPLS traffic 96 marked with the normalized leaf VID and, therefore, does not allow VPLS traffic 96 to reach leaf customer networks 14E, 14F via bridged access network 13B, thereby preventing leaf-to-leaf L2 communication in accordance with the E-TREE service. Egress filter 94 may be programmed in this manner due to the configuration data indicating that access network 19B connects only to leaf nodes. In contrast, filter 94 allows VPLS traffic 98 marked with normalized root VID ("R" in this example) to proceed without being dropped. PE router 16B applies VLAN map 92 to swap the outer normalized root VID with the root VID of access network 13B ("R2" in this example) and forwards VPLS traffic 98 that originated from a root of the E-TREE service to leaf customer networks 14E, 14F via bridged access network 14B, thereby allowing root-to-leaf communications. In this way, traffic 98 is sent using VID R2 while traffic 90 is received with VID L2. This is to block communication between the local leafs 14E and 14F is blocked since access network 13B has E-tree service enabled and filters the traffic with VLAN L2. So, traffic 98 would otherwise be filtered by access network 13B if it is sent using VID L2, thus root traffic 98 is sent using VID R2.

Figure 5B:
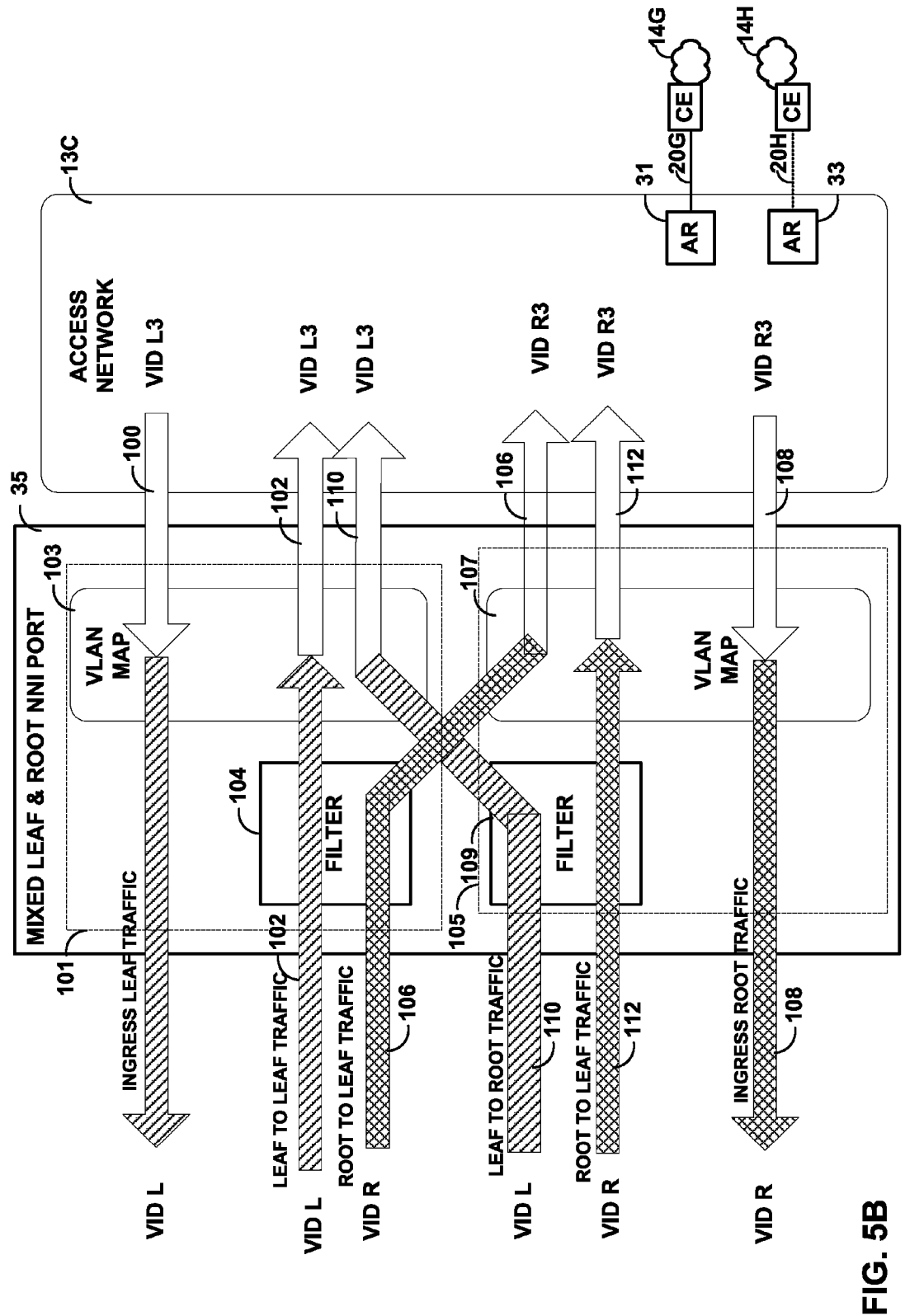

FIGS. 5A and 5B are block diagrams illustrating two different embodiments for processing network traffic at an NNI port of a PE router at the edge of a VPLS core when the router provides E-TREE service to a bridged access network having both leaf nodes and root nodes. For example, FIG. 5A illustrates example processing by PE 16C with respect to network traffic communicated between VPLS core 15 and access network 13C that provides bridged Ethernet connectivity to leaf customer network 14G and root customer network 14H.

As shown in the example of FIG. 5A, PE 16C creates two different customer-facing logical interfaces: a leaf logical interface 101 and a root logical interface 105. Ingress L2 traffic 100 from bridged access network 13C having a VID of "L3" is mapped within the forwarding information to leaf logical interface 101, where PE 16C has been configured to recognize label "L3" as used by access network 13C to indicate the traffic was sourced by a leaf node. Similarly, ingress VLAN tagged traffic 108 having a VID of "R3" is mapped to root logical interface 105 based on label "R3" as indicative that the traffic was sourced by a root node.

Further, PE 16C performs L2 learning on customer-facing logical interfaces 101, 105 to record MAC addresses reachable by the interfaces. For example, upon receiving inbound bridged traffic 100, 108, PE 16C updates a MAC table associated with the VPLS instance to record the source MAC in the inbound traffic as a MAC address reachable by the logical interface on which the traffic was received. In this way, PE 16C performs MAC learning on logical interfaces 101, 105 to learn MAC addresses of leaf nodes and root nodes coupled to access network 13C and to distinguish between the two types of nodes based on the interface on which the MAC was learned. That is, all MAC that are learned as reachable through leaf logical interface 101 are treated as leaf nodes. All MAC addresses learned as reachable through root logical interface 105 are treated as root nodes.

Moreover, when processing leaf ingress VLAN traffic 100 from bridged access network 13C at NNI port 35, PE 16C applies VLAN map 102 associated with leaf logical interface 101. In this case, VLAN map 102 is configured to swap the outer VID ("L3") for the normalized leaf VID ("L") to form VLAN tagged L2 packets for normalized leaf VLAN 22B of VPLS core 15. At this time PE 16C updates the MAC table for the VPLS instance to record the source MAC address of the received VLAN packet as a leaf node. PE 16C pushes any additional pseudowire labels and forwards the VPLS traffic to PEs 16A, 16B through VPLS core 15 in accordance with VPLS forwarding requirements.

Similarly, when processing root ingress VLAN traffic 108 at NNI port 35 from bridged access network 13C, PE 16C determines that the traffic was received on root logical interface 105 and applies VLAN map 107 to swap the outer VID ("R3") for the normalized root VID ("R") to form VLAN tagged packets for normalized root VLAN 22A of VPLS core 15. In addition, at this time PE 16C updates the MAC table for the VPLS instance to record the source MAC address within the received bridged VLAN packet as a root node. PE 16C may also push any additional pseudowire labels and forwards the VPLS traffic to PEs 16A, 16B through VPLS core 15 in accordance with VPLS forwarding requirements.

When processing VPLS traffic egressing the VPLS core 15 and being output to bridged access network 13C, L2 forwarding requirements cause PE router 16C to perform a MAC lookup to determine whether a destination MAC of the egress VPLS traffic has previously been learned via leaf logical interface 101 or root logical interface 105. If so, PE router 16C selects either leaf logical interface 101 or root logical interface 105 as the egress interface for the VPLS traffic based on which interface the destination MAC address of the outbound L2 communication was previously learned. Based on the selection of the egress customer-facing logical interface 101, 105 as the egress interface, PE router 16C applies the appropriate filtering and VLAN mapping operation, as described below.

For example, upon selecting logical interface 101 as the egress interface for leaf VPLS traffic egressing VPLS core 15 to bridged access network 13C, PE router 16C applies filter 104 of the logical interface to filter VPLS traffic based on whether the VPLS traffic carries the normalized leaf VID or the normalized root VID used within VPLS core 15. For VPLS traffic 102, for example, since selection of logical interface 101 indicates that the destination MAC address corresponds to a leaf node, filter 104 discards VPLS traffic 102 that is marked with the normalized leaf VID. In this way, PE router 16C does not allow outbound leaf VPLS traffic 102 to reach access network 13C, thereby preventing leaf-to-leaf L2 communication in accordance with the E-TREE service. In contrast, filter 104 allows VPLS traffic 106 marked with normalized root VID ("R" in this example) to proceed without being discarded even though the destination MAC address has been learned and associated with a leaf node. PE router 16C applies VLAN map 104 to swap the outer normalized VID with the S-VID of access network 13C ("R3" in this example) and forwards VPLS traffic 106 that originated from a root of the E-TREE service to access network 14C, thereby allowing root-to-leaf communications.

Similarly, upon selecting root logical interface 105 as the egress interface for outbound VPLS traffic addressed to root nodes, e.g., leaf VPLS traffic 110 and root VPLS traffic 112, PE router 16C first applies filter 109 to the VPLS traffic. In this case, filter 109 is configured to allow both leaf VPLS traffic 110 and root VPLS traffic 112 to proceed without being discarded. That is, because logical interface 105 has been selected as the egress customer-facing interface, the destination MAC address of the traffic exiting the VPLS core must have been previously learned on root logical interface 105 and, therefore, recorded as a root node. PE router 16C applies VLAN map 107 to swap the outer normalized VID of the VPLS traffic 110, 112 with the appropriate leaf or root VID of access network 13C ("R3" or "L3") and forwards the VPLS traffic to access network 13C. In other word, the forwarding components of PE router 16C is configured such that selection of logical interface 105 as an egress interface results in conditional rules in accordance with VLAN map 107 to swap an outer VID of the normalized VID of "L" with the leaf VID of "L3" or swap the normalized VID of "R" with the root VID of "R3" as defined within access network 13C, thereby allowing both leaf-to-root and root-to-root communications for the E-TREE service.

FIG. 5B is a block diagram illustrating a second example embodiment of processing network traffic at an NNI port of a PE router that provides E-TREE service to a bridged network having both leaf nodes and root nodes. In some cases, the forwarding components of a router may not be flexible enough to allow an egress interface to be associated with a complex set of rules for conditional swapping the outer VID with different labels, such as described with respect to root logical interface 105 and the rules specified by VLAN mapping 107 associated therewith. The embodiment shown in FIG. 5B may avoid the need for such rules and, therefore, may be utilized in routers that otherwise would be unable to support the embodiment shown in FIG. 5A. For example, as shown in FIG. 5B, the VLAN swapping rules implemented by VLAN map 107 associated with customer-facing logical interface 105 result in an outer VID of "R3" being swapped onto all traffic egressing VPLS core 15 via that logical interface. Similarly, the VLAN swapping rules implemented by VLAN map 103 associated with customer-facing logical interface 101 results in an outer VID of "L3" being swapped onto all traffic egressing VPLS core 15 by that logical interface. As explained below, filters 104, 109 are configured to direct traffic between logical interfaces 101, 105 under certain conditions, e.g., as changed next hops within the forwarding components of PE router 16C. This technique may result in additional processing associated with a subsequent lookup processes within the forwarding information for selection of a subsequent, chained next hop interface, however, the forwarding component need not support more complex conditional tag swapping rules described above with respect to FIG. 5A.

In the example embodiment of FIG. 5B, PE 16C processes ingress network traffic as described with respect to FIG. 5A. For example, PE 16C processes inbound leaf bridged Ethernet traffic 100 as described with respect to FIG. 5A. That is, upon receiving bridged Ethernet traffic 100, PE 16C performs a lookup on the outer VID of "L3" and selects logical interface 101 for the VLAN tag. PE router 16C applies the rules specified within VLAN map 102 associated with logical interface 101 to swap the outer VID ("L3") for the normalized leaf VID ("L") for forwarding the L2 packets on normalized leaf VLAN 22B of VPLS core 15. Similarly, PE 16C processes inbound root bridged Ethernet traffic 108 by selecting customer-facing root logical interface 105 based on the VLAN tag "R3" and applying VLAN map 107 associated with that logical interface to swap the VID "R3" for the normalized root VID "R" to form VLAN tagged packets for normalized root VLAN 22A of VPLS core 15. Furthermore, as described above, PE 16C performs L2 learning on customer-facing logical interfaces 101, 105 to record MAC addresses of root nodes and leaf nodes reachable by the interfaces and to distinguish between the two types of nodes based on the interface on which the MAC was learned.

However, in the embodiment of FIG. 5B, PE router 16C processes egress traffic from VPLS core 15 in a different manner than the embodiment described above with respect to FIG. 5A. In this example, PE router 16C is configured to rely on access switches "AR" of access network 13C to enforce E-TREE forwarding constraints. That is, PE router 16C egresses the outbound traffic from VPLS core 15 with the proper VLAN tags but does not apply filters 104, 109 to discard any of the traffic. Instead, filters 104, 109 associated with the logical interfaces 101, 105 are configured to redirect the outbound traffic under certain conditions between the two logical interfaces associated with NNI port 35.

In particular, for outbound VPLS traffic, PE router 16C selects logical interfaces 101, 105 based on which interface the destination MAC address was learned. PE router 16C then applies filters 104, 109 of logical interfaces 101, 105 to filter the VPLS traffic 102, 106, 110 and 112 based on the outer normalized VLAN tag. In the case where leaf logical interface 101 is selected based on the destination MAC and filter 104 detects leaf VPLS traffic 102 having the normalized leaf VID, the filter does not discard the leaf VPLS traffic 102, as in the embodiment of FIG. 5A, and instead passes the traffic to VLAN map 103 to swap the leaf normalized VID ("L") with the leaf S-VID of access network 13C ("L3") for forwarding to access network 14C. PE route 16C may be configured to pass through outbound VPLS traffic tagged with the leaf normalized VID ("L") instead of dropping the traffic because in some instances, as explained below, the VPLS traffic may have been redirected from root logical interface 105 and, therefore, was sourced by a root node and should not be dropped. That is, in the case where logical interface 101 is reached as a chained next hop from logical interface 105, both filter 104 and VLAN map 103 may be applied by the forwarding component of the router and, therefore, filter 104 is configured not to drop any outbound VPLS traffic having the leaf normalized VID ("L"). Any outbound traffic 102, 110 communicated by PE router 16C to bridged access network 13C that is ultimately destined for a leaf node will be filtered by the edge access switches of the access network. In the example of FIG. 5B, access switch 31 applies the forwarding constraints of the E-TREE services to discard outbound leaf VLAN traffic having a VID of ("L3") while access switch 33 is configured to forward the outbound leaf VLAN traffic to customer network 14H via access link 20H. In the case where leaf logical interface 105 is selected as the egress interface based on the destination MAC and filter 109 detects root VPLS traffic 112 having the root normalized VID ("R"), PE router 16C applies VLAN map 107 to swap the root normalized VID with the root VID of access network 13C ("R3") and forwards VPLS traffic 112 that originated from a root of the E-TREE service to access network 14C. In this case, both access switches 31, 33 are configured to forward root VLAN traffic having a VID of ("R3") to customer networks 14G, 14H on the respective access links 20G, 20H. In this way, ARs 31, 33 enforce the requirements to prevent leaf-to-leaf communications and allow root-to-root communications for the E-TREE service.

For egress root-to-leaf VPLS traffic 106 or egress leaf-to-root traffic 110, forwarding information within PE router 13C is configured such that logical interfaces 101, 105 form a chained next hop where a packet lookup resolving to packet processing by one of the interface ultimately points to packet processing by the other logical interface. Example details of chained next hops within a forwarding component can be found in U.S. application Ser. No. 12/266,298, entitled "PLATFORM-INDEPENDENT CONTROL PLANE AND LOWER-LEVEL DERIVATION OF FORWARDING STRUCTURES,", the entire contents of which are incorporated herein by reference.

For example, upon receiving an outbound VPLS packet, a forwarding component of PE router 16C may perform a lookup in the forwarding information to resolve a MAC address of the VPLS packet to egress logical interface 101. Moreover, PE router 16C may apply filter 104 and detect root-to-leaf traffic 106, i.e., traffic having a destination MAC address that was learned on logical interface 101 and having a normalized root VID ("R"). In this case, filter 104 is configured to redirect root-to-leaf traffic 106, e.g., as a chained next hop, to logical interface 105. In turn, the forwarding component of PE router 16C selects egress root logical interface 105 and, in response, may apply filter 109 associated with root logical interface 105, which passes root-to-leaf VPLS traffic 106 to VLAN MAP 107 to replace the normalized VID with the VID of access network 13C ("R3") for forwarding to customer networks 14G, 14H via access link 20H. Similarly, upon receiving an outbound VPLS packet having a destination MAC address originally learned on logical interface 105, PE router 15C applies filter 109 to detect any leaf-to-root traffic 110 having a leaf normalized VID ("L"). In this case, filter 109 redirects leaf-to-root traffic 110 to logical interface 101 as a chained next hop. PE router 16C selects logical interface 101 and, after possibly applying filter 104 which passes through leaf-to-root VPLS traffic 110, applies VLAN MAP 103 of leaf logical interface 101 to replace the leaf normalized VID ("L") with the leaf VID of access network 13C ("L3"). In this way, leaf-to-root traffic 110 and root-to-leaf traffic 106 are properly labeled and delivered to access network 13C. Access switches 31, 33 seamlessly enforce the requirements for only leaf-to-root and root-to-leaf communications for the E-TREE service.

In FIGS. 5A, 5B BUM (broadcast, unknown-unicast, multicast) traffic is flooded to both the logical interfaces 101, 105. To avoid sending duplicate copies to the access network, leaf filter 104 filters all the BUM traffic, while the root filter 109 processes the BUM traffic as learned unicast data.

Figure 6:
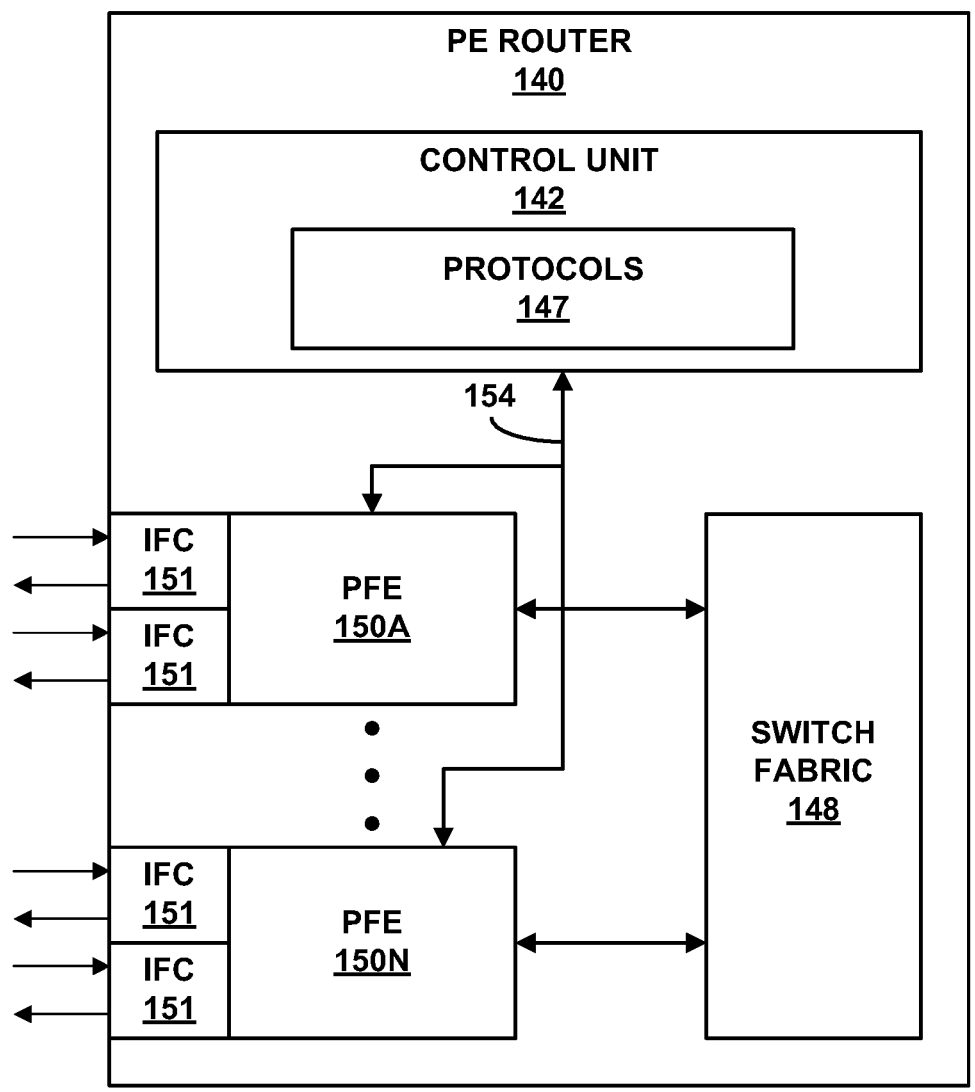
FIG. 6 is a block diagram illustrating an example router, such any of PE routers of FIG. 1.

FIG. 6 is a block diagram illustrating an example router 140, such any of PE routers 16 of FIG. 1. In this example, router 140 includes a control unit 142 that provides control plane functionality for the router. Router 140 also includes a plurality of packet-forwarding engines 150A-150N ("PFEs 150") and a switch fabric 148 that collectively provide a data plane for forwarding network traffic, such as the Ethernet L2 frames and VLAN traffic described herein.

PFEs 150 receive and send data packets via interface cards 151 ("IFCs 151"). In other embodiments, each of PFEs 150 may comprise more or fewer IFCs. Although not shown, PFEs 150 may each comprise a central processing unit (CPU), memory and supporting hardware. Switch fabric 148 provides a high-speed interconnect for forwarding incoming data packets to the correct one of PFEs 150 for transmission over a network.

Control unit 142 provides control plane functions for Router 140. For example, control unit 142 provides an environment for executing a control plane component of the VPLS protocol. In addition, control unit 142 may provide an operating environment for executing routing protocols and/or a spanning tree protocol, executing CFM protocols to provide fault isolation and detection over large L2 networks, and providing a management interface to allow user access and configuration of router 140. The operating environment of control unit 142 may be implemented solely in software, or hardware, or may be implemented as a combination of software, hardware or firmware. For example, control unit 142 may include one or more processors which execute software instructions. In that case, control unit 142 may include various software modules or daemons, and may include a computer-readable storage medium, such as computer memory or hard disk, for storing executable instructions.

In this example, control unit 142 is connected to each of PFEs 150 by a dedicated internal communication link 154. For example, dedicated link 154 may comprise a 200 Mbps Ethernet connection. Control unit 142 may maintain a forwarding information base (FIB) (not shown) that represents a logical topology of the network, e.g., a spanning tree. In addition, the FIB may include information specifying VLANS, including VLAN tags and identifiers, such as the S-VLANS and C-VLANs described herein. Further, control unit 142 may generate one or more filters and VLAN maps as described herein and update the FIB to associate the filters and VLAN maps with logical or physical interfaces of router 140.

In one embodiment, control unit 142 communicates data representative of a software copy of the FIB as well as the filters and VLAN maps into each of PFEs 150 to program the PFEs and thereby control forwarding of traffic within the data plane. This allows the software FIB, filters and VLAN maps stored in memory (e.g., on-chip RAM) of in each of PFEs 150 to be updated without degrading packet-forwarding performance of router 140. In some instances, control unit 142 may derive separate and different software FIBs, filters and VLAN maps for each respective PFEs 150. In addition, one or more of PFEs 150 include application-specific integrated circuits (ASICs) (not shown) that PFES 150 programs with a hardware-copy of the FIB based on the software FIBs (i.e., hardware versions of the software FIBs) copied to each respective PFE 30.

Figure 7:
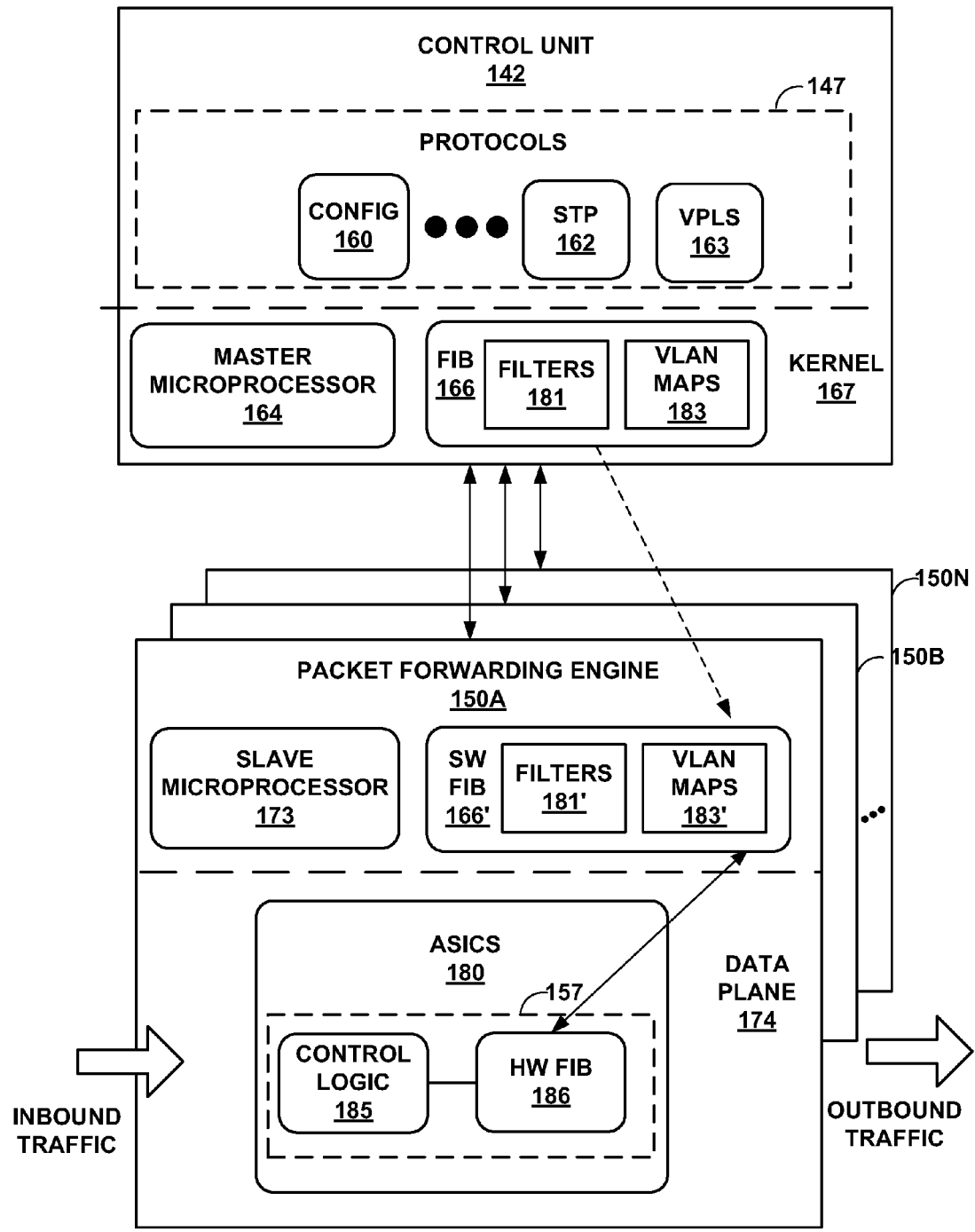
FIG. 7 is a block diagram illustrating an example embodiment of the router 140 of FIG. 6 in further detail.

FIG. 7 is a block diagram illustrating an example embodiment of the router 140 of FIG. 6 in further detail. In this example, control unit 142 provides a "control plane" operating environment for execution of various software protocols 147, such as a configuration protocol or management interface 160, a spanning tree protocol 162, and the VPLS protocol 163. Control unit 142 may include other protocols and additional software processes not shown in FIG. 7. Protocols 147 execute on and interact with kernel 167 (e.g., by way of API calls). Master microprocessor 164 executing kernel 167 generates forwarding information in the form of FIB 166, including filters 181 and VLAN MAPS 183, based on commands and instructions received from protocols 147 and configuration interface 160, which may include entries for various VLANS and other configuration information related to the E-TREE service. Typically, master microprocessor 164 may generate FIB 166 in the form of a radix tree to map packet information (e.g., header information having destination information and/or a label stack) to next hops and ultimately to interface ports. Master microprocessor 164 of kernel 167 then programs PFEs 150 to install copies of the FIBs as software FIBs 168.

In this example, ASICs 180 are microcode-controlled chipsets programmably configured by a slave microprocessor 173 executing on each of PFEs 150 (e.g., PFE 30A). That is, one or more of ASICs 180 may be controllable by microcode 157 programmed by slave microprocessor 173. Slave microprocessor 173 programs a hardware FIB 186 into internal memory of ASICs 180 within the data plane 174 based on software FIB 168, thereby configuring forwarding ASICs 180. Control logic 185 updates SW FIB 166' when forwarding L2 traffic to maintain and update L2 state information, including MAC addresses and respective physical ports of IFCs 151 by which the MAC addresses are reachable.

In general, when router 140 receives a packet, ASICS 180 identifies an associated next hop for the packet by traversing forwarding information of HW FIB 186 based on information (e.g., labeling information) within the packet. ASICS 180 forwards the packet on an outbound interface to the corresponding next hop in accordance with the forwarding information. At this time, ASICS 180 may push and/or pop labels from the packet to forward the packet along a correct pseudowire, VLAN and/or access link. In some cases, ASICS 180 may select an outbound interface after traversing a series of chained next hops defined within HW FIB 186. For example, when forwarding an L2 packet, control logic 185 accesses HW FIB 166' and, upon selecting a FIB entry for the L2 packet, microcode-implemented control logic 185 automatically selects a physical or logical forwarding interface for the L2 packet or, in some cases, selects multiple forwarding interfaces to flood or broadcast the L2 packet based on the current L2 state information for the L2 network. At this time, control logic 185 of forwarding ASICS 180 applies any filters 181' and VLAN maps 183' to support metro Ethernet "E-TREE" service over a packet-switched MPLS network, including a VPLS core, as described herein. In some cases, a logical forwarding interface may point to a second logical forwarding interface, i.e., forming a chained next hop.

When forwarding packets, data plane 174 performs MAC address learning as described herein to automatically update portions of SW FIB 166'. That is, data plane 174, performs MAC address learning and may update one or more MAC tables within the FIB to record MAC addresses of the data packets in association with the physical or logical interface on which the packets were received.

Various embodiments of the invention have been described. These and other embodiments are within the scope of the following claims.

The invention claimed is:

1. A method comprising:
receiving layer two (L2) communications for a plurality of customer networks at a plurality of provider edge (PE) routers, wherein the PE routers provide a Virtual Private LAN Service (VPLS) through a provider network for the plurality of customer networks, wherein the PE routers provide an Ethernet service in which each customer network is designated as either a root node or a leaf node and root nodes are permitted to communicate with all other node and customer networks designated as leaf nodes are permitted to communicate only with customer networks that are designated as root nodes, and wherein the customer networks are coupled to the PE routers by at least two different types of L2 access networks;

applying a normalized leaf virtual local area network (VLAN) tag associated with a single leaf VLAN to the L2 communications that originated from the customer networks designated as leaf nodes, wherein applying the normalized leaf VLAN tag comprises applying the same normalized leaf VLAN tag to all of the L2 communications originating from the customer networks designated as leaf nodes regardless of the type of L2 access network to which the customer networks designated as leaf nodes are coupled;

applying a normalized root VLAN tag associated with a single root VLAN to the L2 communications that originated from customer networks designated as root nodes, wherein applying the normalized root VLAN tag comprises applying the same normalized root VLAN tag to all of the L2 communications regardless of the type of L2 access network that couples the customer network to the PE routers;

transporting all of the L2 communications tagged with the normalized leaf VLAN tag through the service provider network on the single leaf VLAN; and transporting all of the L2 communications tagged with the normalized root VLAN tag through the service provider network on the single root VLAN.

2. The method of claim 1, wherein at least one of the customer networks designated as a root node and at least one of the customer networks designated as a leaf node are coupled to a first one of the PE routers through one of the access networks by a root point-to-point VLAN and a leaf point-to-point VLAN, respectively, and wherein the method further comprises:

receiving egress VPLS traffic exiting the VPLS at the first PE router;

selecting an egress interface for the VPLS traffic;

applying a filter to the VPLS traffic to discard the VPLS traffic having the normalized leaf VLAN tag when the egress interface is associated with the leaf point-to-point VLAN;

applying the filter to the VPLS traffic to forward the VPLS traffic having the normalized leaf VLAN tag when the egress interface is associated with the root point-to-point VLAN; and applying the filter to the VPLS traffic to forward the VPLS traffic having the normalized root VLAN tag when the egress interface is associated with either the leaf point-to-point VLAN or the root point-to-point VLAN.

3. The method of claim 1, wherein at least one of the customer networks designated as a root node and at least one of the customer networks designated as a leaf node are coupled directly to a first one of the PE routers through a root User Network Interface (UNI) port and a leaf UNI port of the router, respectively, wherein the method further comprises:

receiving egress VPLS traffic exiting the VPLS at the first PE router;

selecting an egress interface for the VPLS traffic;

applying a filter to the VPLS traffic to discard the VPLS traffic having the normalized leaf VLAN tag when the egress interface is associated with the leaf UNI port;

applying the filter to the VPLS traffic to forward the VPLS traffic having the normalized leaf VLAN tag when the egress interface is associated with the root UNI port; and applying the filter to the VPLS traffic to forward the VPLS traffic having the normalized root VLAN tag when the egress interface is associated with either the leaf UNI port or the root UNI port.

4. The method of claim 1, further comprising:

creating a leaf logical interface and a root logical interface to receive L2 communications from one of the customer networks designated as a root node and one of the customer networks designated as a leaf node that are coupled to a first one of the PE routers through a bridged Ethernet access network, recording, with the first PE router, L2 network addresses of the L2 communications received on the root logical interface from the customer network designated as the root node;

recording, with the first PE router, L2 network addresses of the L2 communications received on the leaf logical interface from the customer network designated as the leaf node;

receiving egress VPLS traffic exiting the VPLS at the first PE router;

selecting either the leaf logical interface or the root logical interface for the VPLS traffic based on destination MAC addresses of the VPLS traffic and the recorded L2 network addresses;

upon selecting the leaf logical interface, applying a filter to the VPLS traffic to discard the VPLS traffic having the normalized leaf VLAN tag and forward the VPLS traffic having the normalized root VLAN; and upon selecting the root logical interface, applying a filter to the VPLS traffic to forward the VPLS traffic having either the normalized leaf VLAN tag or the normalized root VLAN.

5. The method of claim 4, further comprising:

upon selecting the leaf logical interface, applying a VLAN map associated with the leaf logical interface to swap the normalized root VLAN tag with a root VLAN tag used with the bridged access network; and upon selecting the root logical interface, applying a VLAN map associated with the root logical interface to perform a conditional swap of the normalized root VLAN tag with either a root VLAN tag or the normalized leaf VLAN tag with the leaf VLAN tag used with the bridged access network.

6. The method of claim 1, further comprising:

creating a leaf logical interface and a root logical interface to receive L2 communications from one of the customer networks designated as a root node and one of the customer networks designated as a leaf node that are coupled to a first one of the PE routers through a bridged Ethernet access network, recording, with the first PE router, L2 network addresses of the L2 communications received on the root logical interface from the customer network designated as the root node;

recording, with the first PE router, L2 network addresses of the L2 communications received on the leaf logical interface from the customer network designated as the leaf node;

receiving egress VPLS traffic exiting the VPLS at the first PE router;

selecting either the leaf logical interface or the root logical interface for the VPLS traffic based on destination MAC addresses of the VPLS traffic and the recorded L2 network addresses;

upon selecting the leaf logical interface, applying a filter to the VPLS traffic to redirect the VPLS traffic having the normalized root VLAN from the leaf logical interface to the root logical interface; and upon selecting the root logical interface, applying a filter to the VPLS traffic to redirect the VPLS traffic having the normalized leaf VLAN from the root logical interface to the leaf logical interface.

7. The method of claim 5, further comprising:

upon selecting the leaf logical interface, applying a VLAN map associated with the leaf logical interface to swap the normalized root VLAN tag with a root VLAN tag used with the bridged access network; and upon selecting the leaf logical interface, applying a VLAN map associated with the root logical interface to swap the normalized root VLAN tag with a root VLAN tag and to swap the normalized leaf VLAN tag with a leaf VLAN tag used with the bridged access network.

8. A network device comprising:

a hardware forwarding component having a leaf logical interface and a root logical interface to receive layer two (L2) communications from a bridged L2 access network, wherein the leaf logical interface receives L2 communications from a customer network designated as a leaf node and the root logical interface receives L2 communications from a customer network designated as a root node of a Ethernet service in which each of a plurality of customer networks is designated as either a leaf node that is permitted to communicate only with root nodes or as a root node that is permitted to communicate with all other nodes of the Ethernet service;

a data structure updated by the forwarding component to store L2 network addresses of the L2 communications received on the root logical interface and the leaf logical interface;

a Virtual Private LAN Service (VPLS) protocol to establish a VPLS with one or more other network devices to transport the L2 communications through a service provider network as VPLS packets;

a filter associated with the leaf logical interface configured to apply a normalized leaf virtual local area network (VLAN) tag associated with a single leaf VLAN to the L2 communications received on the leaf logical interface to form tagged VLAN packets for transport through the VPLS on the single leaf VLAN that carries all L2 communications from leaf nodes that are coupled to the service provider network by a plurality of different types of access networks, wherein the filter applies the same normalized leaf VLAN tag to all of the L2 communications originating from the customer networks designated as leaf nodes regardless of the type of L2 access network to which the customer networks designated as leaf nodes are coupled; and a filter associated with the root logical interface configured to apply a normalized root VLAN tag associated with a single root VLAN to the L2 communications received on the root logical interface to form tagged VLAN packets for transport through the VPLS on the single root VLAN that carries all L2 communications from root nodes that are coupled to the service provider network by a plurality of different types of access networks, wherein the filter applies the same normalized root VLAN tag to all of the L2 communications regardless of the type of L2 access network that couples the customer network to the network device.

9. The network device of claim 8, wherein the forwarding component provides an egress of the VPLS to forward egress VPLS packets to the bridged L2 access network as outbound L2 communications via the root logical interface and the leaf logical interface based on whether destination L2 network addresses of the L2 communications were learned on the root logical interface or the leaf logical interface, and wherein the filter associated with the root logical interface is configured to perform a conditional swap of the normalized root VLAN tag on the outbound L2 communications to replace the normalized root VLAN tag with either a root VLAN tag or the normalized leaf VLAN tag with a leaf VLAN tag used with the bridged access network.

10. The network device of claim 8, wherein the forwarding component provides an egress of the VPLS to forward egress VPLS packets to the bridged L2 access network as outbound L2 communications via the root logical interface and the leaf logical interface based on whether destination L2 network addresses of the L2 communications were learned on the root logical interface or the leaf logical interface, wherein the filter associated with the leaf logical interface is configured to redirect the outbound L2 communications having the normalized leaf VLAN tag from the leaf logical interface to the root logical interface for forwarding to the bridged L2 access network, and wherein the filter associated with the root logical interface is configured to redirect the outbound L2 packets having the normalized leaf VLAN tag from the root logical interface to the leaf logical interface for forwarding to the bridged L2 access network.

11. The network device of claim 10, further comprising forwarding information that specifies chained next hop forwarding structures to redirect the traffic between the leaf logical interface and the root logical interface.

12. The network device of claim 8, wherein the network device comprises a provider edge router.

13. A network device comprising:

a hardware forwarding component having a leaf logical interface and a root logical interface to receive layer two (L2) communications from a bridged L2 access network, wherein the leaf logical interface receives L2 communications from a customer network designated as a root node and the leaf logical interface receives L2 communications from a customer network designated as a leaf node of a Ethernet service in which each of a plurality of customer networks is designated as either a leaf node that is permitted to communicate only with root nodes or as a root node that is permitted to communicate with all other nodes of the Ethernet service;

a data structure updated by the forwarding component to store L2 network addresses of the L2 communications received on the root logical interface and the leaf logical interface;

a Virtual Private LAN Service (VPLS) protocol to establish a VPLS with one or more other network devices to transport the L2 communications through a service provider network as VPLS packets;

a filter associated with the leaf logical interface configured to apply a normalized leaf virtual local area network (VLAN) tag associated with a single leaf VLAN to the L2 communications received on the leaf logical interface to form tagged VLAN packets for transport through the VPLS on the single leaf VLAN, wherein the filter applies the same normalized leaf VLAN tag to all of the L2 communications originating from the customer networks designated as leaf nodes regardless of the type of L2 access network to which the customer networks designated as leaf nodes are coupled; and a filter associated with the root logical interface configured to apply a normalized root VLAN tag associated with a single root VLAN to the L2 communications received on the root logical interface to form tagged VLAN packets for transport through the VPLS on the single root VLAN, wherein the filter applies the same normalized root VLAN tag to all of the L2 communications regardless of the type of L2 access network that couples the customer network to the network device, wherein the filter associated with the leaf logical interface is configured to redirect egress VPLS packets having the normalized leaf VLAN tag from the leaf logical interface to the root logical interface for forwarding to the access network as outbound L2 communications, and wherein the filter associated with the root logical interface is configured to redirect egress VPLS packets having the normalized leaf VLAN tag from the root logical interface to the leaf logical interface for forwarding to the access network as outbound L2 communications.

14. The network device of claim 13, further comprising forwarding information that specifies chained next hop forwarding structures to redirect the traffic between the leaf logical interface and the root logical interface.

15. The network device of claim 13, wherein the network device comprises a provider edge router.

* * * * *